US009690616B2

(12) United States Patent
Prakash

(10) Patent No.: US 9,690,616 B2
(45) Date of Patent: Jun. 27, 2017

(54) BASED ON NATURAL LOAD DETERMINATION EITHER ADJUST PROCESSOR SLEEP TIME OR GENERATE ARTIFICIAL LOAD

(75) Inventor: Shyam Prakash, Bellevue, WA (US)

(73) Assignee: Optis Circuit Technology, LLC, Plano, TX (US)

( * ) Notice: Subject to any disclaimer, the term of this patent is extended or adjusted under 35 U.S.C. 154(b) by 911 days.

(21) Appl. No.: 13/976,819

(22) PCT Filed: Dec. 20, 2011

(86) PCT No.: PCT/EP2011/073458
§ 371 (c)(1),
(2), (4) Date: Oct. 17, 2013

(87) PCT Pub. No.: WO2012/089564
PCT Pub. Date: Jul. 5, 2012

(65) Prior Publication Data
US 2014/0040914 A1 Feb. 6, 2014

Related U.S. Application Data

(60) Provisional application No. 61/442,928, filed on Feb. 15, 2011.

(30) Foreign Application Priority Data

Dec. 30, 2010 (IN) .......................... 3173/DEL/2010

(51) Int. Cl.
*G06F 9/46* (2006.01)
*G06F 11/34* (2006.01)

(52) U.S. Cl.
CPC .......... *G06F 9/461* (2013.01); *G06F 11/3414* (2013.01); *G06F 11/3433* (2013.01); *Y02B 60/165* (2013.01)

(58) Field of Classification Search
None
See application file for complete search history.

(56) References Cited

U.S. PATENT DOCUMENTS 6,804,627 B1  10/2004  Marokhovsky et al.
7,254,721 B1 *  8/2007  Tobias .................. G06F 1/3203
                                                              713/300

(Continued)

FOREIGN PATENT DOCUMENTS

GB   2 468 291 A   9/2010

OTHER PUBLICATIONS

International Search Report issued in corresponding International application No. PCT/EP2011/073458, date of mailing Apr. 4, 2012.

*Primary Examiner* — Meng An
*Assistant Examiner* — Caroline H Arcos
(74) *Attorney, Agent, or Firm* — Spencer C. Patterson; Grable Martin Fulton PLLC

(57) ABSTRACT

Methods and devices for determining load on a computing device involve scheduling at least one idle thread for execution during a first sleep time of a predefined reference interval and, determining a natural load at a lapse of the first sleep time. If the natural load equals or exceeds a fixed load requirement for the predefined reference interval, a second sleep time is scheduled for the remainder of the predefined reference interval. If, instead, the natural load is less than the fixed load requirement and a fixed load time for the fixed load requirement equals the remainder of the predefined reference interval, an artificial load is generated for the remainder of the predefined reference interval.

16 Claims, 4 Drawing Sheets

(56) References Cited

U.S. PATENT DOCUMENTS

| | | | |
|---|---|---|---|
| 7,509,646 B1 | 3/2009 | Maw et al. | |
| 2005/0193258 A1* | 9/2005 | Sutton | G06F 11/3409 |
| | | | 714/32 |
| 2006/0288346 A1* | 12/2006 | Santos | G06F 9/4887 |
| | | | 718/102 |
| 2009/0271152 A1 | 10/2009 | Barrett | |
| 2010/0037222 A1* | 2/2010 | Tatsubori | G06F 9/542 |
| | | | 718/100 |
| 2010/0274530 A1 | 10/2010 | Chen | |

\* cited by examiner

BASED ON NATURAL LOAD DETERMINATION EITHER ADJUST PROCESSOR SLEEP TIME OR GENERATE ARTIFICIAL LOAD

TECHNICAL FIELD

The present subject matter relates, in general, to a method and a device for determination of load and, in particular, to determination of load on a computing device.

BACKGROUND

Generally, the load on a computing device, such as a desktop computer, a portable computer, and a mobile phone, may be measured in terms of various performance parameters. Examples of the performance parameters include central processing unit (CPU) utilization, memory utilization, input/output capacity, network load, or a combination thereof. The measurement of load may be useful in various applications. In one scenario, the load of a computing device measured, say in terms of CPU load, can be used to alter voltage and frequency of a clock signal provided to the CPU by using techniques, such as dynamic voltage and frequency scaling.

In another scenario, the measured load may be useful in load testing of the computing device, specifically in generation of an artificial load. Load testing is the process of creating demand or artificial load on the computing device and subsequently, measuring the device's response to the total load. The total load may include both the artificial load and a default natural load of the computing device. Such testing further involves monitoring the performance of the computing device under various load conditions, identifying potential scalability problems, determining the maximum capacity of the computing device, and identifying bottlenecks, if any, that might interfere with the computing device operating at that capacity.

However, conventional schemes of load measurement operate while the CPU is in execution. In other words, the measurement is performed during a time interval within which one or more processes are scheduled for execution. In effect, the result of such measurements may be inaccurate. Since the measured load is provided as input to various applications, for example, load-testing applications, such applications also fail to provide correct results.

SUMMARY

This summary is provided to introduce concepts related to a method and a device for load determination. The concepts are further described below in the detailed description. This summary is not intended to identify essential features of the claimed subject matter nor is it intended for use in determining or limiting the scope of the claimed subject matter.

In a first aspect, the invention concerns the method for determining a natural load on a computing device. The method includes scheduling at least one idle thread for a sleep time and determining the natural load at a lapse of the sleep time. The determining includes scheduling a loadgen thread to determine the natural load. The priority of the loadgen thread is higher than a priority of the idle thread and lower than a priority of a worker thread. The method further includes modifying a device parameter based at least on the determination. The device parameter is at least one of an operating voltage of a computing device, a frequency of a clock signal provided to the computing device, and an artificial load provided to the computing device, based at least on the natural load. In an implementation, the method also includes initializing one or more load parameters. The load parameters include at least one of a pre-defined reference interval, a fixed load, and a priority of the loadgen thread.

The determining further includes comparing the natural load and a fixed load after lapse of the sleep time, computing at least one remnant load parameter if the natural load is less than the fixed load, and based on the computing, determining whether a remaining fixed load time is equal to a remaining reference interval. If the remaining fixed load time is equal to the remaining reference interval, the method includes generating an artificial load based on the determining. However, if the remaining fixed load time is less than remaining reference interval, then the method includes re-scheduling the idle thread for a re-computed value of the sleep time, where the re-computed value of the sleep time is based at least on a remaining portion of the fixed load.

In a second aspect, the invention concerns a computing device configured to determine natural load on say, a processor or a device bus. The device includes a processor and a memory coupled to the processor. The memory includes a load determination module configured to schedule at least one idle thread for the sleep time and determine the natural load at a lapse of the sleep time. The memory also includes a modification module configured to modify a device parameter based on the natural load. The computing device is one of a mobile phone, a desktop computer, a portable computer, a hand-held device, a smart phone, an a load-testing device.

In a third aspect, the invention concerns a computer readable medium method having embodied thereon a computer program for executing a method for determining the natural load on a computing device. The method includes initializing a pre-defined reference interval and determining the natural load at any instant within the pre-defined reference interval by scheduling a loadgen thread. The priority of the loadgen thread is higher than a priority of an idle thread and lower than a priority of a worker thread. The method further includes comparing the natural load and a fixed load, computing at least one remnant load parameter if the natural load is less than the fixed load and based on the computing, determining whether a remaining fixed load time is equal to a remaining reference interval. If the remaining fixed load time is equal to the remaining reference interval, the method includes generating an artificial load on conformance with remaining portion of the fixed load.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components. For simplicity and clarity of illustration, elements in the figures are not necessarily to scale. Some embodiments of devices and/or methods in accordance with embodiments of the present subject matter are now described, by way of example only, and with reference to the accompanying figures, in which:

FIG. 1(*b*) illustrates the generation of fixed load in a pre-defined reference interval, according to an embodiment of the present subject matter.

DETAILED DESCRIPTION

Figure 1A:
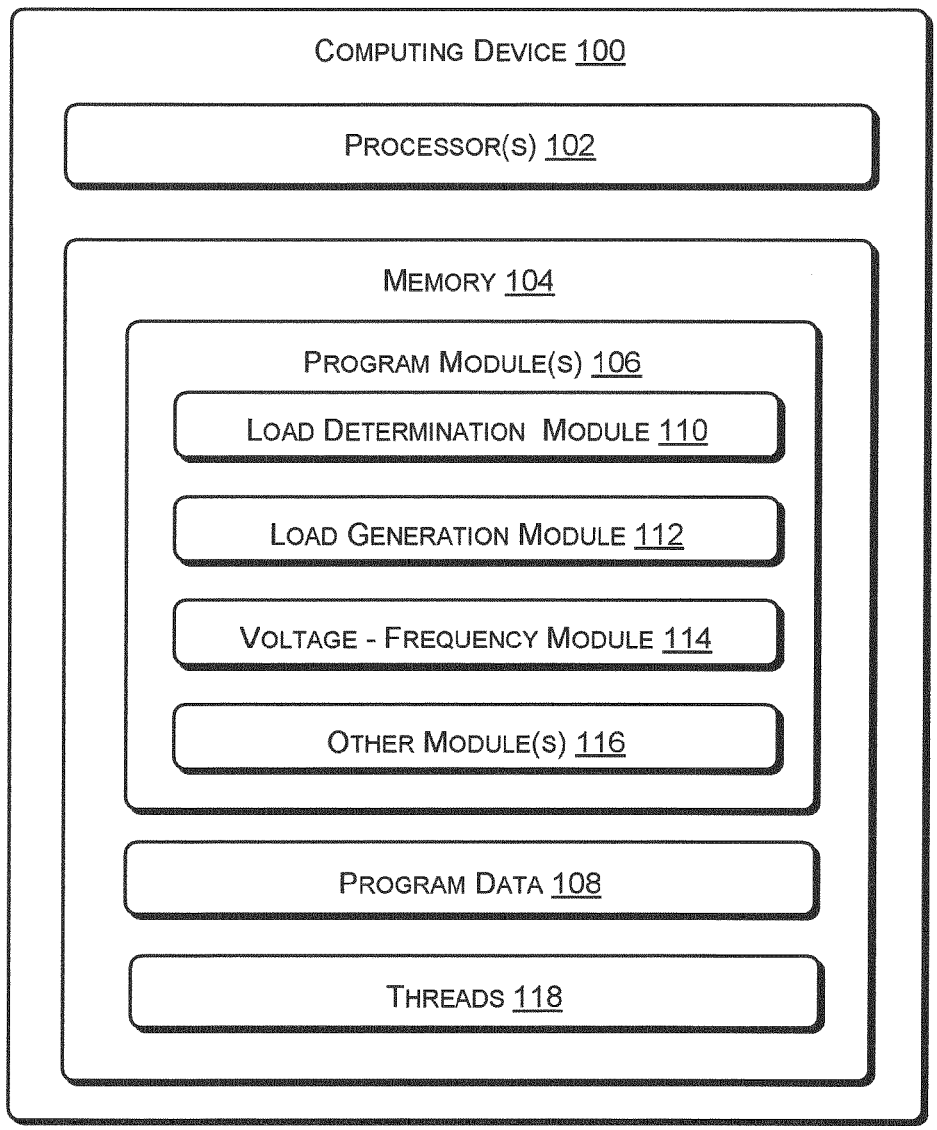
FIG. 1(*a*) illustrates an exemplary computing device configured to compute natural load, according to an embodiment of the present subject matter.

With the advancements in computer technology, computing devices, for example, personal computers and laptops, have become more compact and portable. Improved processing speed of the central processing units (CPU) located within the computing devices and a decreased or optimum power consumption of such devices is a desired attribute. Such management of power consumption may be dependent on the measurement of the load on the CPU as in certain schemes an operating voltage and/or frequency of the clock signal provided to the CPU can be varied based on the load. If the load is not measured correctly, the voltage and the frequency could be incorrectly scaled. This, in turn, translates into excessive power consumption and reduced carbon footprints.

Another application in which the measurement of the load may be useful is in load testing, for example, for generation of an artificial load while load testing. Generally, load testing involves modeling an expected usage of the computing device by simulating real-world conditions. For example, the load testing involves simulating the actions of relatively large number of users connected to the computing device by subjecting the computing device with a fixed load and evaluating its performance. The fixed load is typically defined for a predetermined time interval or a series of time intervals. The fixed load includes both the load generated naturally by the computing device, also referred to as natural load, and artificial load that is generated by a load-testing device, in case the natural load is not equal to the fixed load.

The natural load should be accurately determined as the artificial load is generated such that the fixed load requirement is met within a pre-determined time interval. Further, in conventional schemes, the artificial load is generated immediately after the natural load is computed. However, if any interrupts are received after the artificial load is generated, the fixed load requirement is violated as the interrupts contribute towards the natural load in the pre-defined time interval. In other words, due to unscheduled interrupts, the computation of the natural load is inaccurate and a higher amount of the artificial load is unnecessarily generated. Further, one or more threads generating the artificial load are typically scheduled with normal priority and therefore, consume considerable resources of the computing device. Since such schemes do not ensure fixed load, troughs in load generation are observed.

Typically, to determine the natural load for applications, such as load testing or dynamic voltage frequency scaling, the natural load is determined during the execution of device processes. The device processes may be implemented in the form of threads, for example, worker threads. In an example, the natural load may be computed after the execution of a first worker thread and during the execution of a second worker thread. In such a scenario, however, the load determination may not take into account the load generated by the second worker thread, thereby rendering the result of the load determination inaccurate.

To this end, devices and methods for determining load on one or more computing based components, for example processor, are described. Although the description may have been explained with reference to processor load, the description can be extended to other loads, such as device bus load, as well. In an implementation, the exemplary method includes initializing one or more load parameters, for example, pre-defined reference interval, fixed load, and prioritization of threads, such as the worker, idle and loadgen threads. The pre-defined reference interval is a time interval; say 100 milliseconds, within which the load, such as natural load, is determined. In case of load testing, the pre-defined reference interval may also be the time interval within which the device's response is determined corresponding to a fixed load.

Subsequent to initialization, the natural load is determined. In one implementation, the natural load can be determined through execution of a loadgen thread. A loadgen thread can be considered to be any process, which when executed, would result in the determination of the natural load at the time when the loadgen thread is executed. In one implementation, the loadgen thread is scheduled before an idle thread for determining the natural load. Such scheduling ensures that the natural load is not computed between the execution of the worker threads, thereby ensuring that the natural load determination is accurate.

In one embodiment, the determination of the natural load at a pre-determined instant, for example, any instant within the pre-defined reference interval, may be used as an input for varying the frequency of the clock signal or operating voltage being provided to the processor, while the computing device is in operation. Based on the value of the natural load, the operating point, which can be a function of voltage and frequency, may be varied. For example, if the natural load is 100%, the processor may be configured to work on 600 MHz, whereas if the natural load is 50%, the processor may be configured to work on 300 MHz, thereby reducing the power consumed. Thus, power consumption can be reduced, as well as device performance can be significantly improved as and when required.

As was indicated previously, load testing may also be based on determination of the natural load. Based on the natural load, the load testing schemes generate the artificial load, which together with the natural load is useful in testing the performance of the computing device at a desired fixed load. Generation of an incorrect artificial load can, in turn, affect the load testing of the computing device. Therefore, an accurate natural load determination would consequently ensure better load testing.

In one implementation, once the load parameters, such as fixed load, are initialized, the processor is allowed to sleep for a sleep time. For example, an idle thread may be scheduled for a sleep time. In one implementation, the sleep time may be determined based on the fixed load. During the sleep time, a scheduler may have scheduled one or more worker threads. Such worker threads together contribute towards the natural load. At a lapse of the sleep time, a loadgen thread is scheduled. After the loadgen thread has determined the natural load at the end of the sleep time, an inquiry is made to check whether the natural load is less than the fixed load. If the answer to this inquiry yields a "yes", the sleep time and one or more remnant load parameters are computed based at least on the natural load. Examples of remnant load parameters include, but are not limited to, remaining fixed load time, remaining reference interval, and remaining portion of the fixed load.

For sake of explanation only, the remaining portion of the fixed load can be computed from the difference between the fixed load and the natural load. Similarly, the remaining fixed load time is the time for which the remaining portion of the fixed load is to be generated. Based on the remnant parameters, it is further determined whether the remaining fixed load time is equal to the remaining reference interval. If the remaining fixed load time is equal to the remaining reference interval, an artificial load, which is in conformance with the remaining portion of the fixed load, is generated. During the artificial load generation, a worker thread may get re-scheduled. In such an event, the priority is handed over to the worker thread, followed by re-computation of the sleep time and the remnant load parameters.

However, if the remaining fixed load time is less than the remaining reference interval, the sleep time is computed based on the remaining portion of the fixed load. Again, at the lapse of the sleep time, the loadgen thread is computed. The process continues until either the required portion of the fixed load is generated naturally or the remaining fixed load time is equal to the remaining reference interval, at which point, the desired artificial load is generated as explained hereinabove.

The operation can be better understood with the help of the following example. It will be appreciated that the example is not limiting to the scope of the present subject matter. Consider a load testing scenario in which at the start of a reference interval of say 100 milliseconds (ms), a fixed load of 40% is to be assumed. This implies that the fixed load consumes 40% of the pre-defined reference interval. In such a case, the processor is made to sleep for the first 60 ms assuming that if the processor does not generate the natural load of 40%, the processor will have to artificially generate load in the last 40 ms. At the lapse of 60 ms, the natural load is determined via the loadgen thread. As mentioned before, the natural load may be a result of the contribution by one or more worker threads. In an example, assuming that the loadgen thread computes the natural load as 30% during the sleep time, the remaining fixed load time and remaining portion of the fixed load are computed at the lapse of the sleep time. In the current example, the remaining fixed load time is 10 ms and the remaining portion of the fixed load is 10%. Therefore, the processor is allowed to sleep for another 30 ms. Again, during the 30 ms of the sleep time, the processor may receive one or more worker threads, further adding to the natural load. If at the lapse of the re-computed sleep time, the natural load is computed to be equal to the fixed load, i.e., 40%, the processor sleeps for the remainder of the pre-defined reference interval as no artificial load needs to be generated. However, if the natural load is not sufficient at the lapse of the re-computed sleep time, the processor has no other choice but to generate the remaining portion of fixed load artificially by itself.

As can be clearly seen, the present subject matter provides for accurately determining the natural load, which in turn, can be further used for generating the artificial load when it is determined that the processor can no longer generate load naturally based on an accurate determination of natural load, say during load testing. In other words, the processor is tested with least minimum artificial load. As a result, responses of the resources meeting the requirements of fixed load are better observed during load testing purposes. Additionally, the loadgen thread, which is used for determining the natural load at a pre-determined instant, may be configured to run in the background and therefore, need not be scheduled. Further, since the loadgen thread is a low priority thread, device resources and power are minimally consumed.

The present subject matter also provides for balancing load between one or more computing based components, for example processors, based on the values of natural load. Devices that can implement the disclosed method include, but are not limited to, desktop computers, hand-held devices, laptops or other portable computers, mobile phones, landline phones, and the like.

Further, it should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Moreover, all statements herein reciting principles, aspects, and embodiments of the present subject matter, as well as specific examples thereof, are intended to encompass equivalents thereof.

It will be appreciated by those skilled in the art that the words during, while, and when as used herein are not exact terms that mean an action takes place instantly upon an initiating action but that there may be some small but reasonable delay, such as a propagation delay, between the initial action, and the reaction that is initiated by the initial action. Additionally, the word "connected" is used throughout for clarity of the description and can include either a direct connection or an indirect connection. The descriptions and details of well-known components are omitted for simplicity of the description. Further, it will be understood that the scheduling of a process or thread also indicates the execution of the thread.

FIG. 1(a) illustrates an exemplary computing device 100 configured to determine load, for example default or natural load on the computing device 100, according to an embodiment of the present subject matter. The computing device 100 may be a desktop computer, a hand-held device, a laptop or other portable computer, a mobile phone, and a landline phone. Alternatively, the computing device 100 may be a load-testing device connected to device, such as a mobile phone, for load testing of the mobile phone. In an embodiment, the computing device 100 includes a central processing unit, hereinafter referred to as processor 102, and a memory 104. The processor 102 can be a single processing unit or a combination of multiple processing units. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions stored in the memory 104.

The memory 104 may include any computer-readable medium known in the art including, for example, volatile memory such as SRAMs and DRAMs and/or non-volatile memory such as EPROMs and flash memories. The memory 104 includes program module(s) 106 and program data 108. In one implementation, the program module(s) 106 include, for example, a load determination module 110, a load generation module 112, a voltage-frequency module 114, and other module(s) 116. It will be appreciated that each of the program module(s) 106 can be implemented as a combination of one or more different modules. For example, the load generation module 112 and the voltage-frequency module 114 may be included within a single modification module (not shown in the figure). The other module(s) 116 include programs that supplement applications or functions performed by the computing device 100. The program data 108 serves, amongst other things, as repository for storing data pertinent to functioning of the program modules 106.

Figure 1B:
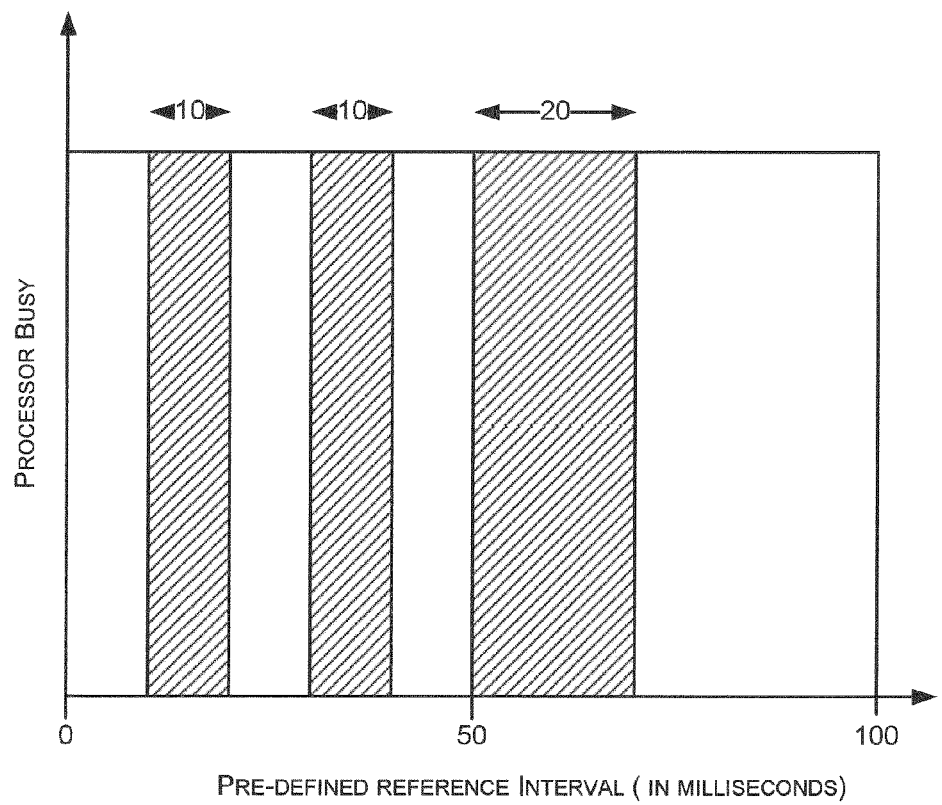

As per one implementation, the computing device 100 is configured to determine a natural load and accordingly modify one or more device parameters of the computing device 100 through one of the load generation module 112 and the voltage-frequency module 114. Examples of device parameters include, but are not limited to, an artificial load, an operating voltage of the computing device 100, a frequency of a clock signal provided to the computing device 100, etc. The natural load can be indicative of, in one example, the processor load. The processor load can be considered to be the amount or percentage of time the processor 102 is busy in executing one or more device processes. This is further explained with reference to an example illustrated in FIG. 1(*b*).

According to the present example, a 40% processor load in a pre-defined reference interval of say, 100 milliseconds, indicates that the processor 102 is busy executing device processes for 40 milliseconds (shown in shaded block) and idle or waiting for interrupts for the rest of the 60 milliseconds. Thus, the natural load, i.e., 40%, may be computed using the following relationship (1):

$$\text{Natural Load} = \left(\frac{\text{Pre-defined Reference Interval-Idle Time}}{\text{Pre-defined Reference Interval}}\right) \times 100 \quad (1)$$

The natural load, in another example, can be understood as the default load on a device bus (not shown in the figure), which interconnects sub-components in a system-on-chip.

Referring back to FIG. 1(*a*), the memory 104 also includes threads 118. In general, when processes are complex and utilize a large amount of computational resources during execution, each complex process is divided into one or more paths of execution, also referred to as threads, such as the threads 118. In one implementation, the threads 118 may include at least one worker thread, at least one idle thread, and a load generation thread (also referred to as loadgen thread). The worker threads are associated with device processes, whereas the idle thread when scheduled indicates that the processor 102 is in an idle state. A loadgen thread can be considered to be any process, which when executed, would result in the determination of the natural load at the instant when the loadgen thread is executed. Furthermore, the worker thread has the highest priority while the idle thread has the lowest priority. In an example, the priority of the loadgen thread is just one higher than the priority of the idle thread. In a scenario where an interrupt is generated, the interrupt is given the same priority as a worker thread, and is scheduled before the loadgen thread and the idle thread.

The program module(s) 106 and their operations are discussed in detail in the following paragraphs. It will be understood that even though the description may have been explained with reference to processor load, the description can be extended to other device loads as well.

As per one implementation, the load determination module 110 initializes one or more load parameters, for example, pre-defined reference interval, priority of the loadgen thread, and fixed load. The pre-defined reference interval can be a time interval, say 100 milliseconds, within which the natural load is determined. In a scenario in which the computing device 100 is a load-testing device, the pre-defined reference interval is also the time interval within which a device's response is determined corresponding to a fixed load. In one example, the fixed load may be user-defined based on the computing device 100 to be tested. The fixed load may include both the natural load and the artificial load.

Once the load parameters are initialized, the load determination module 110 schedules the loadgen thread to compute a natural load. The natural load is defined as the load that is naturally created by default applications executing on the computing device 100. For example, applications of a mobile phone such as receiving calls, receiving software updates, etc., may contribute towards its natural load. As mentioned earlier, the loadgen thread is scheduled just before an idle thread, thus ensuring that the natural load is not computed between the execution of worker threads. This, in turn, ensures that the measurement of natural load is accurate since the completion of all the worker threads is kept into consideration.

In one implementation, the measurement of the natural load at any instant may be used as an input to a voltage-frequency module 114. In response to the values of the natural load, the operating point, which is a function of voltage and frequency, may be dynamically varied. It will be understood that the processor 102 may operate at various operating points based on the voltage and frequency of the clock signal provided to the processor 102. In an example, if the natural load is 100%, the processor may be configured to work on 600 MHz, whereas if the natural load is 50%, the processor may be configured to work on 300 MHz, thereby reducing the power consumed. Accordingly, power consumption can be reduced, as well as device performance can be significantly improved based on requirements.

In an alternative or additional implementation, the load determination module 110 may allow the processor 102 to sleep for a sleep time by, for example, scheduling at least one idle thread for the sleep time. For determination of the natural load while the computing device 100 is in operation, such sleep time may be pre-configured by a user or by an administrator. However, for determination of the natural load on a computing device 100 connected to a load-testing device, the sleep time may be determined based on the fixed load. For example, consider a load testing scenario in which at the start of a pre-defined reference interval, say 100 milliseconds (ms), a fixed load of 60% is assumed. In such a case, the processor 102 is configured to sleep for the first 40 ms of the pre-defined reference interval assuming that if the processor 102 does not generate natural load, the processor 102 will have to artificially generate an artificial load of 60% in the last 60 ms of the pre-defined reference interval. Thus, the selection of the sleep time ensures that if the processor 102 does not generate natural load during the sleep time, the load generation module 112 has enough time in the remainder of the pre-defined reference interval to generate load artificially.

In said implementation, during the sleep time, there may be a case in which a scheduler (not shown in the figure) within the computing device 100, may have scheduled one or more worker threads, requesting device resource allocation as a consequence of device interrupts or otherwise. Such worker threads would contribute towards the natural load.

Once the sleep time lapses, the load determination module 112 schedules a loadgen thread to determine the natural load. After the loadgen thread determines the natural load at the end of the sleep time, the load determination module 110 compares the natural load with the fixed load. If, on comparison, it is determined that the natural load is equal to the fixed load, the load determination module 110 does not generate an artificial load and allows the processor 102 to sleep for the remainder of the pre-defined reference interval. On the other hand, if it is determined that the natural load is less than the fixed load, the load determination module 110 computes one or more remnant load parameters, for example, remaining fixed load time, remaining reference interval, and remaining portion of the fixed load. For sake of explanation only, the remaining portion of the fixed load may be defined as the difference between the fixed load and the natural load. Similarly, whereas the remaining fixed load time is the time required for which the remaining portion of the fixed load is to be generated. The remaining reference interval can be understood as time of pre-defined reference interval remaining after the processor 102 has slept for the sleep time.

Based on the remnant parameters, the load determination module 110 makes a second comparison to determine whether the remaining fixed load time is equal to the remaining reference interval. If the load determination module 110 determines that the remaining fixed load time is equal to the remaining reference interval, the load generation module 112 generates an artificial load. In an implementation, the artificial load is generated in conformance with the remaining portion of the fixed load. It will be appreciated by a person skilled in the art that during artificial load generation, an interrupt may need to get processed. In such an event, the interrupt acts like a worker thread and preempts the loadgen thread based on priority. Thus, the worker thread performs execution after which the sleep time and remnant load parameters are re-computed.

However, if the load determination module 110 determines that the remaining fixed load time is less than the remaining reference interval, the load determination module 110 re-computes sleep time based at least on the remaining portion of the fixed load. The load determination module 110 re-schedules the idle thread for the re-computed value of the sleep time.

Again, during the sleep time, other worker threads may be allowed to get scheduled. After the lapse of the sleep time, the load determination module 110 re-schedules the loadgen thread, which re-computes the natural load, as the value may have changed on account of the additional worker threads during the sleep time.

Subsequently, the load determination module 110 determines whether or not the updated natural load is less than the fixed load. If the natural load is equal to the fixed load, the processor 102 is allowed to sleep for rest of the pre-defined reference interval. However, if the updated natural load is less than the fixed load, the load determination module 110 computes one or more remnant load parameters, for example, remaining fixed load time and remaining portion of the fixed load. Based on the comparison of the one or more remnant parameters with each other, the load generation module 112 either generates the desired artificial load or allows the processor 102 to further sleep. In this fashion, the computing device 100 allows for generation of as much natural load as possible by deferring the generation of the artificial load. This process continues till either the fixed load is matched with the natural load only, or as a combination of the natural load and the artificial load.

Figure 2:
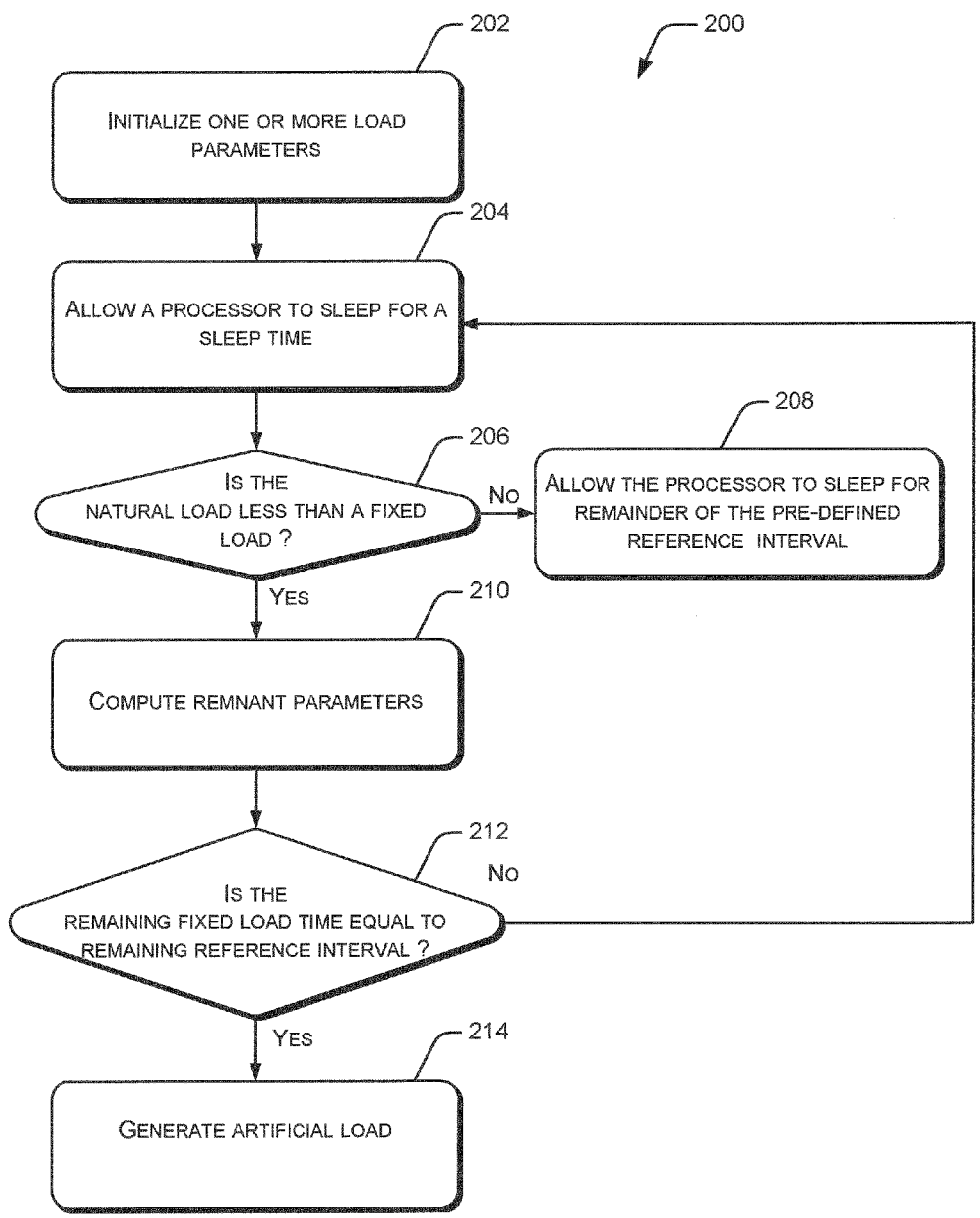
FIG. 2 illustrates an exemplary method for determining natural load on a computing device, according to an embodiment of the present subject matter.

FIG. 2 illustrates an exemplary method 200 for determination of load, such as the natural load, on a computing device, in accordance with an embodiment of the present subject matter. The method 200 is described in the context of processor load, however the method 200 may be extended to cover other kinds of device loads. Additionally, even though the method is described in the context of the computing device 100 as a load-testing device, the method is also implementable on other applications as will be understood by a person skilled in the art. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as a magnetic disks and magnetic tapes, hard drives, or optically readable digital data storage media.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 202, one or more load parameters are initialized. In an example, the load parameters, for example, pre-defined reference interval, priority of the loadgen thread, and fixed load. In one implementation, a load determination module 110, initializes the load parameters.

At block 204, a processor is allowed to sleep for a sleep time. In an implementation, the sleep time may be determined based at least, in part, on the fixed load. For example, at the start of a pre-defined reference interval, say 100 milliseconds (ms), a fixed load of 60% can be assumed. In such a case, the processor 102 is made to sleep for the first 40 ms assuming that if the processor 102 does not generate natural load, the processor will have to artificially generate load in the last 60 ms.

At block 206, it is determined whether the natural load is less than the fixed load. For example, the load determination module 110 determines the natural load at the lapse of the sleep time. Based on the natural load, a device parameter may be modified. Examples of device parameter include an operating voltage, a frequency of a clock signal, and an artificial load. In an implementation, the load determination module 110 checks whether the artificial load should be generated based on a comparison between the natural load with the fixed load. If the natural load is greater than or equal to the fixed load ("No" branch from block 206), the processor 102 is allowed to sleep for the remainder of the pre-defined reference interval (block 208). In such a case, the idle threads are scheduled for the remainder of the pre-defined reference interval, thereby indicating that the fixed load requirement has been met and no artificial load is to be generated. However, if the natural load is less than the fixed load ("Yes" branch from block 206), one or more remnant parameters are computed at block 210. The remnant parameters include, for example, the remaining portion of the fixed load, the remaining reference interval, and the remaining fixed load time. In one implementation, the load determination module 110 computes the remaining portion of the fixed load as the difference between the fixed load and the natural load. In another implementation, the load determination module 110 further computes a remaining fixed load time, which is the time required for generating the remaining portion of the fixed load. Further, a remaining reference interval, which is the difference between the pre-defined reference interval and the sleep time, is also calculated.

At block 212, it is determined whether the remaining fixed load time is less than the remaining reference interval. In one implementation, the load determination module 110 compares the remaining fixed load time and the remaining reference interval. If it is determines that the remaining fixed load time is equal to the remaining reference interval ("Yes" branch from block 212), the required artificial load is generated (block 214). In one implementation, the load generation module 112 generates the artificial load.

If it is determined that the remaining fixed load time is less than the remaining reference interval ("No" branch from block 212), the processor is allowed to sleep for a recomputed value of sleep time (block 204). During this period, one or more idle threads may be scheduled. In one implementation, the sleep time is computed by the load determination module 110 based on the remaining portion of the fixed load. Additionally, during the sleep time, the processor 102 may receive additional worker threads resulting from device interrupts. Subsequently, the method proceeds to block 206 where the natural load is re-computed after the lapse of the sleep time. The process continues until either the required fixed load is generated naturally or the remaining fixed load time is equal to the remaining reference interval, at which point, the load generation module 112 generates the desired artificial load as described at block 214.

In another implementation, based at least on the natural load, at least one of the voltage and frequency of the clock signal to the processor 102 may be dynamically varied to operate on a higher or lower operating point.

Figure 3:
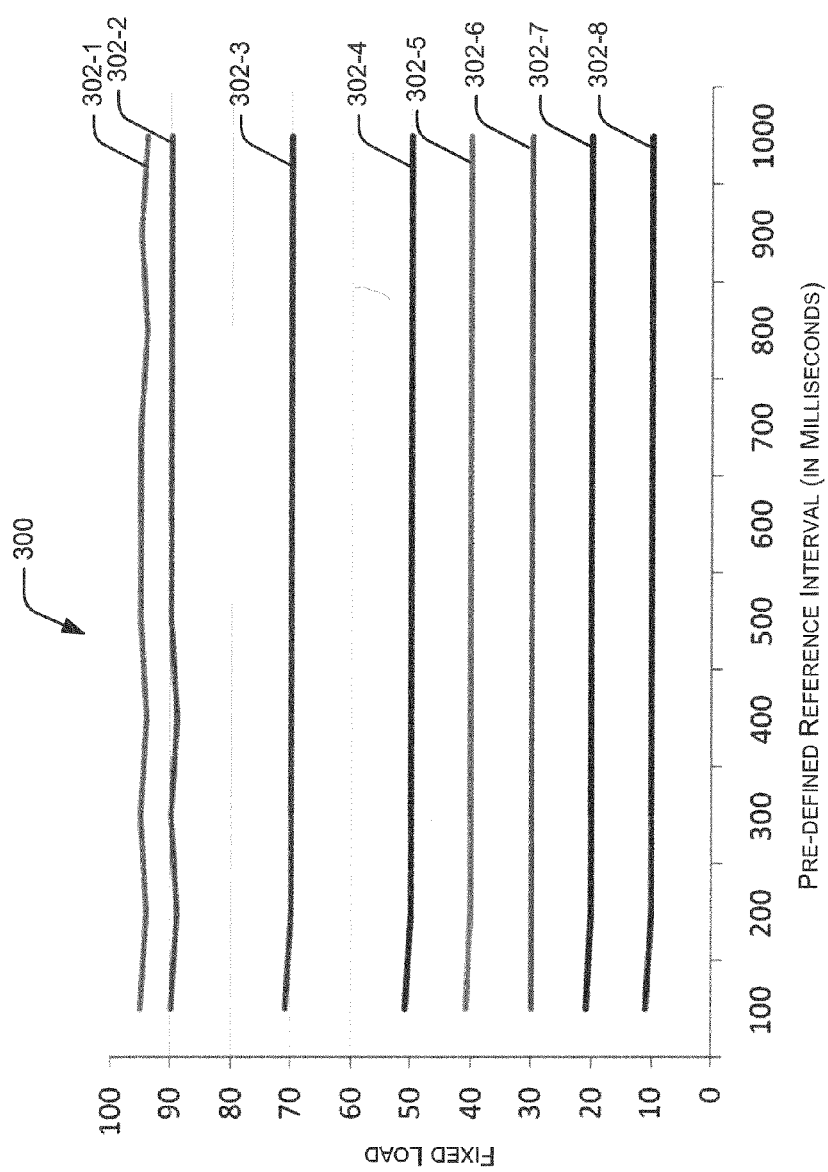
FIG. 3 illustrates a graph representing constant fixed load over a period of time, according to an embodiment of the present subject matter.

FIG. 3 illustrates a graph 300 representing constant fixed load over a period of time. As shown in the graph 300, the fixed load is substantially constant with time. For example, the curve 302-1 shows that for a fixed load of 95% is maintained over time. Similarly, the curves 302-2, 302-3, 302-4, 302-5, 302-6, 302-7, and 302-8 illustrate that a fixed load of 90%, 70%, 50%, 40%, 30%, 20%, and 10%, respectively, is maintained over a pre-defined reference interval. Further, as the pre-defined reference interval increases, the fixed load continues to be almost constant and the accuracy also increases. In an example, the accuracy of the load determination is about 98% to about 100% in case the pre-defined reference interval is in milliseconds. In another example, the accuracy is about 99% to about 100% in case the pre-defined reference interval is in minutes.

Although embodiments for load determination have been described in language specific to structural features and/or methods, it is to be understood that the invention is not necessarily limited to the specific features or methods described. Rather, the specific features and methods are disclosed as exemplary embodiments for the load determination.

I claim:

1. A load testing method comprising:
    initializing one or more load parameters, which include at least a predefined reference interval and a fixed load of a processor, wherein the fixed load is a load requirement for the predefined reference interval;
    determining, based on the fixed load, a first sleep time for the processor within the predefined reference interval, wherein a difference between the predefined reference interval and the first sleep time is a first remaining time;
    scheduling at least one idle thread for execution on the processor during the first sleep time, wherein the sleep time starts at a beginning of the predefined reference interval;
    determining a natural load of the processor at an end of the first sleep time;
        when the determined natural load of the processor at the end of the first sleep time is greater than or equal to the fixed load of the processor:
            scheduling the processor to sleep for a second sleep time equal to the first remaining time;
        when the determined natural load of the processor at the end of the first sleep time is less than the fixed load:
            computing remnant parameters, wherein the remnant parameters comprise a remaining portion of the fixed load and a remaining fixed load time, wherein the remaining portion of the fixed load is the difference between the fixed load and the natural load, and wherein the remaining fixed load time equals a time required to generate the remaining portion of the fixed load; and
            when the remaining fixed load time is equal to the first remaining time, generating an artificial load on the processor for the first remaining time, wherein the natural load is a load on the processor due to execution of one or more processes comprising one or more worker threads that does not include the artificial load.

2. The method as claimed in claim 1, wherein the determination of the natural load comprises scheduling a loadgen thread, wherein a priority of the loadgen thread is higher than a priority of the at least one idle thread and lower than a priority of the one or more worker threads, wherein the loadgen thread is a process, which when executed, determines the natural load of the processor at a time when the loadgen thread is executed.

3. The method as claimed in claim 2, wherein the load parameters further comprise a priority of the loadgen thread.

4. The method of claim 1, wherein the fixed load is represented as a percentage of a load of the processor, the first remaining time equals a product of (a) the percentage of the load of the processor and (b) the predefined reference interval, and the first sleep time equals a product of (c) the predefined reference interval and (d) a difference between one hundred percent and the percentage of the load of the processor.

5. The method of claim 1, wherein when the determined natural load of the processor at the end of the first sleep interval is less than the fixed load, the method further comprises:
    determining a third sleep time for the processor within the first remaining time based on a difference between the determined natural load of the processor at the end of the first sleep time and the fixed load;
    scheduling another idle thread for the processor during the third sleep time;
    determining the natural load of the processor at an end of the third sleep time, wherein the determined natural load of the processor at the end of the third sleep time includes the determined natural load of the processor at the end of the first sleep time;
    when the determined natural load at the end of the third sleep time is greater than or equal to the fixed load of the processor:
        scheduling the processor to sleep for a fourth sleep time equal to a difference between the first remaining time and the third sleep time; and
    when the determined natural load of the processor at the end of the third sleep time is less than the fixed load, generating the artificial load by the processor for at least a portion of a difference between the first remaining time and the third sleep time.

6. The method of claim 1, wherein the processor executes the one or more worker threads during the first sleep time.

7. A computing device comprising:
    a processor; and a memory coupled to the processor, the memory comprising at least one load testing program module, which when executed by the processor causes the processor to:
  initialize one or more load parameters, which include at least a predefined reference interval and a fixed load of a processor, wherein the fixed load is a load requirement for the predefined reference interval;
  determine, based on the fixed load, a first sleep time for the processor within the predefined reference interval, wherein a difference between the predefined reference interval and the first sleep time is a first remaining time;
  schedule at least one idle thread for the processor during the first sleep time, wherein the sleep time starts at a beginning of the predefined reference interval;
  determine a natural load of the processor at an end of the first sleep time;
  when the determined natural load of the processor at the end of the first sleep time is greater than or equal to the fixed load of the processor:
    schedule the processor to sleep for a second sleep time equal to the first remaining time; and
  when the determined natural load of the processor at the end of the first sleep time is less than the fixed load:
    compute remnant parameters, wherein the remnant parameters comprise a remaining portion of the fixed load and a remaining fixed load time, wherein the remaining portion of the fixed load is the difference between the fixed load and the natural load, and wherein the remaining fixed load time equals a time required to generate the remaining portion of the fixed load; and
    when the remaining fixed load time is equal to the first remaining time, generate an artificial load on the processor for the first remaining time, wherein the natural load is a load on the processor due to execution of one or more processes comprising one or more worker threads that does not include the artificial load.

8. The computing device as claimed in claim 7, wherein the determination of the natural load comprises scheduling a loadgen thread, wherein a priority of the loadgen thread is higher than a priority of the at least one idle thread and lower than a priority of the one or more worker threads, and wherein the loadgen thread is a process, which when executed, determines the natural load of the processor at a time when the loadgen thread is executed.

9. The computing device as claimed in claim 8, wherein the load parameters further comprise a priority of the loadgen thread.

10. The computing device as claimed in claim 7 is one of a mobile phone, a desktop computer, a portable computer, a hand-held device, a smart phone, and a load-testing device.

11. The computing device of claim 7, wherein the fixed load is represented as a percentage of a load of the processor, the first remaining time equals a product of (a) the percentage of the load of the processor and (b) the predefined reference interval, and the first sleep time equals a product of (c) the predefined reference interval and (d) difference between one hundred percent and the percentage of the load of the processor.

12. The computing device of claim 7, wherein when the determined natural load of the processor at the end of the first sleep interval is less than the fixed load, the at least one load testing program module, when executed by the processor, causes the processor to:
  determine a third sleep time for the processor within the first remaining time based on a difference between the determined natural load of the processor at the end of the first sleep time and the fixed load;
  schedule another idle thread for the processor during the third sleep tune;
  determine the natural load of the processor at an end of the third sleep time, wherein the determined natural load of the processor at the end of the third sleep time includes the determined natural load of the processor at the end of the first sleep time;
  when the determined natural load at the end of the third sleep time is greater than or equal to the fixed load of the processor:
    schedule the processor to sleep for a fourth sleep time equal to a difference between the first remaining time and the third sleep time; and
  when the determined natural load of the processor at the end of the third sleep time is less than the fixed load, generate the artificial load by the processor for the at least a portion of a difference between the first remaining time and the third sleep time.

13. The computing device of claim 7, wherein the processor is adapted to execute the one or more worker threads during the first sleep time.

14. A non-transitory computer-readable medium having embodied thereon a computer program which when executed by a processor causes the processor to execute a load testing method comprising:
  initializing one or more load parameters, which include at least a predefined reference interval and a fixed load of a processor, wherein the fixed load is a load requirement for the predefined reference interval;
  determining, based on the fixed load, a first sleep time for the processor within the predefined reference interval, wherein a difference between the predefined reference interval and the first sleep time is a first remaining time;
  scheduling at least one idle thread on the processor during the first sleep time, wherein the sleep time starts at a beginning of the predefined reference interval;
  determining a natural load of the processor at an end of the first sleep time;
  when the determined natural load of the processor at the end of the first sleep time is greater than or equal to the fixed load of the processor:
    scheduling the processor to sleep for a second sleep time equal to the first remaining time; and
  when the determined natural load of the processor at the end of the first sleep time is less than the fixed load:
    computing remnant parameters, wherein the remnant parameters comprise a remaining portion of the fixed load and a remaining fixed load time, wherein the remaining portion of the fixed load is the difference between the fixed load and the natural load, and wherein the remaining fixed load time equals a time required to generate the remaining portion of the fixed load; and
    when the remaining fixed load time is equal to the first remaining time, generating an artificial load on the processor for the first remaining time, wherein the natural load is a load on the processor due to execution of one or more processes comprising one or more worker threads that does not include the artificial load.

15. The non-transitory computer-readable medium of claim 14, wherein the fixed load is represented as a percentage of a load of the processor, the first remaining time equals a product of (a) the percentage of the load of the processor and (b) the predefined reference interval, and the first sleep time equals a product of (c) the predefined reference interval and (d) a difference between one hundred percent and the percentage of the load of the processor.

16. The non-transitory computer-readable medium of claim 14, wherein when the determined natural load of the processor at the end of the first sleep interval is less than the fixed load, the load testing method further comprises:

determining a third sleep time for the processor within the first remaining, time based on a difference between the determined natural load of the processor at the end of the first sleep time and the fixed load;

scheduling another idle thread for the processor during the third sleep time;

determining the natural load of the processor at an end of the third sleep time, wherein the determined natural load of the processor at the end of the third sleep time includes the determined natural load of the processor at the end of the first sleep time;

when the determined natural load at the end of the third sleep time is greater than or equal to the fixed load of the processor:

scheduling the processor to sleep for a fourth sleep time equal to a difference between the first remaining time and the third sleep time; and when the determined natural load of the processor at the end of the third sleep time is less than the fixed load, generating the artificial load by the processor for the at least a portion of a difference between the first remaining time and the third sleep time.

* * * * *